United States Patent [19]

Boschert et al.

[11] Patent Number: 5,415,272
[45] Date of Patent: May 16, 1995

[54] SPRING CLIP FOR LIVE ROLLER CONVEYOR

[76] Inventors: Raymond T. Boschert, Highway P, Box 216, Flint Hill, Mo. 63346; Gary W. Vanzant, 2708 Clairen Dr., Foristell, Mo. 63348

[21] Appl. No.: 160,666

[22] Filed: Dec. 2, 1993

[51] Int. Cl.⁶ .......................................... B65G 13/02
[52] U.S. Cl. ................... 198/780; 193/35 R; 411/87
[58] Field of Search ............ 198/780, 824; 193/35 R, 193/37; 411/87, 90–92, 95, 97, 530

[56] References Cited

U.S. PATENT DOCUMENTS

| | | | |
|---|---|---|---|
| 177,506 | 5/1876 | Henry | 411/97 |
| 363,196 | 5/1887 | Bay et al. | 411/95 |
| 406,953 | 7/1889 | Perry | 411/91 |
| 444,816 | 1/1891 | Clay | 411/89 |
| 477,222 | 6/1892 | Peck et al. | 411/97 |
| 812,035 | 2/1906 | Franklin | 411/87 |
| 1,191,792 | 7/1916 | Jeffries | 403/149 |
| 1,195,165 | 8/1916 | Baker | 411/87 |
| 1,430,122 | 9/1922 | Sloan | 403/149 |
| 1,509,031 | 9/1924 | Sandstrom | 403/149 |
| 1,544,627 | 7/1925 | Bateman | 411/87 |
| 1,703,379 | 2/1929 | Baughn | 411/90 |
| 1,725,790 | 8/1929 | Halagarda | 411/87 X |
| 2,541,220 | 2/1951 | Du Perret | 193/37 |
| 2,684,260 | 7/1954 | Hawley | 403/149 |
| 2,801,730 | 8/1957 | Strickler | 198/780 |
| 2,877,034 | 3/1959 | Crandall | 403/149 |
| 3,229,742 | 1/1966 | Buckland | 411/87 |
| 3,490,508 | 1/1970 | Nelson | 411/97 |
| 4,577,747 | 3/1986 | Martin | 193/37 X |
| 4,645,071 | 2/1987 | Faulkner et al. | 193/37 X |
| 4,893,975 | 1/1990 | Anthony | 411/87 |

*Primary Examiner*—D. Glenn Dayoan
*Attorney, Agent, or Firm*—Grace J. Fishel

[57] ABSTRACT

A spring clip for damping vibration in a live roller conveyor between a pair of spaced apart roller shafts, each of which has a longitudinal axis, relative to a pair of spaced apart, parallel rails with aligned holes through which opposite ends of the roller shafts pass. The clip is a U-shaped fastener with a pair of opposing arms joined by a bight. The arms have notches for receipt of the roller shafts. When installed between the pair of roller shafts, the U-shaped fastener acts as a spring and exerts a force on the roller shafts tending to seat them so that two adjacent flats of each roller shaft are lodged against two flats of each rail hole thereby damping up-and-down and side-to-side vibration of the shafts in the holes.

8 Claims, 2 Drawing Sheets

SPRING CLIP FOR LIVE ROLLER CONVEYOR

BACKGROUND OF THE INVENTION

1. Field of the Invention

The present invention relates to a spring clip for damping vibration in a live roller conveyor.

2. Brief Description of the Prior Art

In a live roller conveyor, each conveyor roller is mounted on a shaft and each shaft is mounted between a pair of spaced apart, parallel rails such that the ends of the shaft pass through aligned holes in the rails. The holes in the rails are slightly larger than the cross-section of the shaft to allow insertion of the shaft between the rails. The holes in the rails and the shaft are usually hexagonal in cross-section such that the shaft does not turn with the conveyor roller.

The conveyor rollers are driven by a roller drive means such as a drive belt or its equivalent which is moved into driving engagement with the conveyor rollers. When articles are propelled along the roller conveyor at high speeds, the roller shafts tend to vibrate up and down and from side to side in the rail holes. Over time, the holes in the rails tend to mushroom out and at some point the rails must be replaced. The holes would wear better if the rails were made of heavier stock but they are usually made of light material to minimize cost, in addition to weight.

It would be desirable to have a means for damping the vibration of the roller shafts in the rails so that the rails do not have to be replaced as often. Preferably, such a means would be easy to install and remove so that it does not interfere with the removal of the conveyor rollers. Insofar as known, such a means has not been previously available.

SUMMARY OF THE INVENTION

In view of the above, it is an object of the present invention to provide a means for damping the vibration of the roller shafts in the rail holes in a live roller conveyor. It is another object to provide a means for preventing damage to the rail holes that can be easily installed and removed such that the roller conveyors can be easily removed and others installed. Other objects and features of the invention will be in part apparent and in part pointed out hereinafter.

In accordance with the invention, a spring clip for damping up-and-down (axial) and side-to-side (longitudinal) vibration between a pair of spaced apart roller shafts relative to a pair of spaced apart, parallel rails with aligned holes is provided. Each of the roller shafts has a longitudinal axis and each of the aligned holes has a top and a bottom. Opposite ends of the roller shafts pass through the holes and the roller shafts and the holes have flats and similar but not identical regular polygonal cross sections.

The spring clip is a U-shaped fastener adapted to lie in a plane orthogonal to the longitudinal axis of the pair of spaced apart roller shafts. The fastener has a pair of opposing arms, each of which has an inboard and an outboard surface perpendicular to the plane in which the fastener lies. There is a notch in the outboard surface of each arm for receipt of one of said pair of spaced apart roller shafts. The notches are spaced apart a distance greater than the distance between the pair of spaced apart roller shafts when the arms are in unstressed condition and a distance equal to the distance between the pair of spaced apart roller shafts in stressed condition. When the roller shafts are received in the notches, the U-shaped fastener acts as a spring and exerts a force on the roller shafts tending to seat them at the top or bottom of the rail holes so that two adjacent flats of each roller shaft are lodged against two flats of each rail hole thereby damping vibration of the shaft in the hole.

The invention summarized above comprises the constructions and methods hereinafter described, the scope of the invention being indicated by the subjoined claims.

BRIEF DESCRIPTION OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
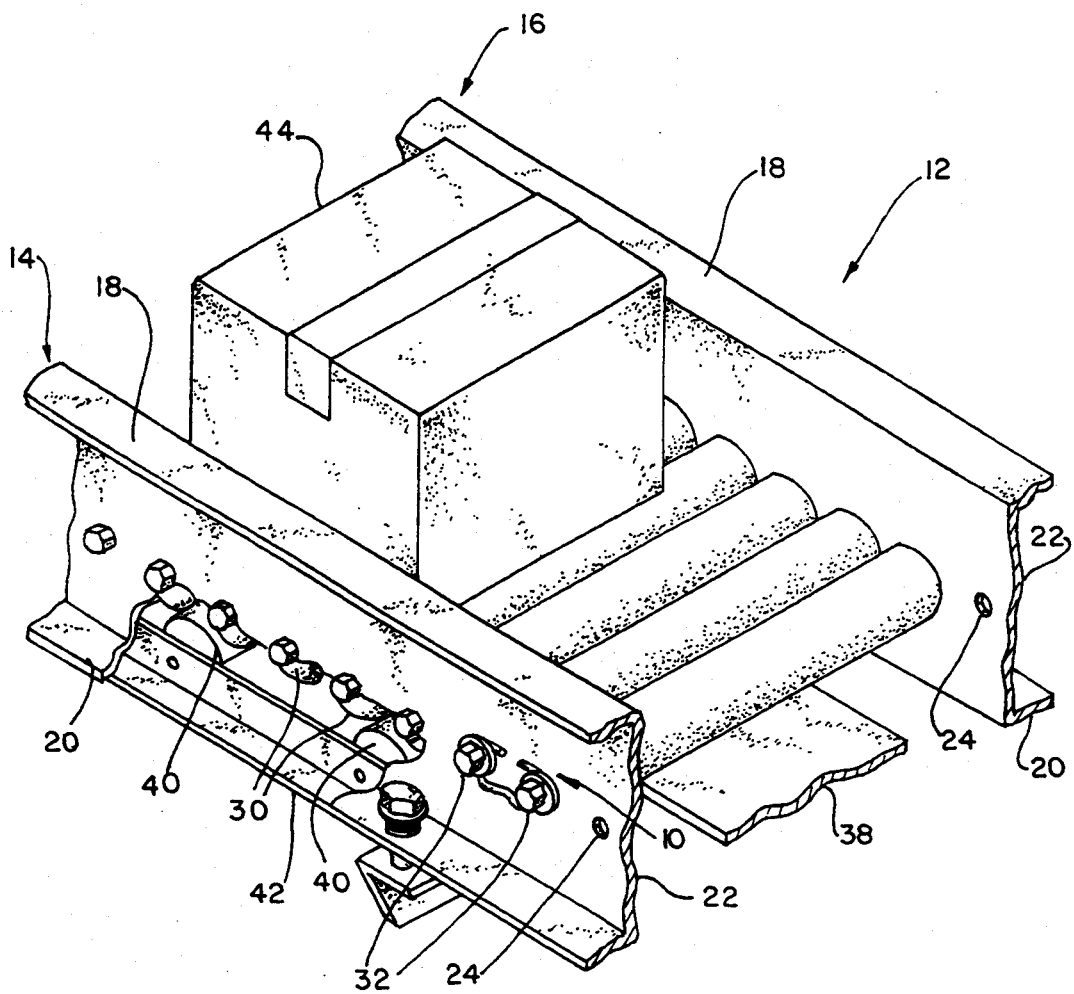
FIG. 1 is a perspective view of a live roller conveyor with a spring clip installed between a pair of spaced apart, roller shafts in accordance with the present invention.

Referring to the drawings more particularly by reference character, a spring clip 10 in accordance with the present invention is seen in use on a live roller conveyor 12. As shown in FIG. 1, live roller conveyor 12 includes a pair of spaced apart, parallel rails 14, 16 supported from the working area upon suitable legs or similar means (not necessary to show). Each of rails 14, 16 is a channel with upper flanges 18, lower flanges 20 and a vertical web 22. Webs 22 are held in spaced relation by spacer bars (not necessary to show). Aligned holes 24 are provided in webs 22, said holes having a top 26 and a bottom 28 viewed with respect to upper and lower flanges 18, 20.

Rails 14, 16 support a plurality of spaced apart conveyor rollers 30. Each conveyor roller 30 is mounted on a roller shaft 32 having a longitudinal axis with the ends of roller shafts 32 passing through aligned holes 24 in the rails. To facilitate installation of the conveyor rollers in the rails, aligned holes 24 are slightly larger in cross-section than roller shafts 32. This permits the roller shaft to be installed in aligned holes 24 by tilting the conveyor roller with respect to rails 14, 16 while inserting one end of the roller shaft into one of holes 24. Roller shaft 32 is then pushed through hole 24 sufficiently far that the opposite end of shaft 32 clears the other rail and is inserted in the opposite aligned hole 24. Cotter pins, spring loaded bearings or the like (not necessary to show) retain shaft 32 in aligned holes 24. Shaft 32 and aligned holes 24 have flats 34, 36, respectively, and similar shaped but not identical sized regular polygonal cross-sections such that shafts 32 do not rotate in holes 24.

As shown in the drawings, the cross-sections of holes 24 and shafts 32 are typically hexagonal and the tolerance between the hole and the shaft usually about 0.32 in. The conveyor rollers can be straight, tapered, plastic coated or otherwise. Commonly, aligned holes 24 are at 2 in. or 2⅜ in. intervals and roller shafts 32 with 7/16 in. and 11/16 in. cross-sections are very common. It will be understood, however, that the particular spacing of holes 24, cross-section of roller shafts 32, tolerances between the shaft and the holes and so forth does not limit the present invention and should therefore require no further explanation to those ordinarily skilled in the pertinent art.

Conveyor rollers 30 are normally engaged by a suitable drive member 38 which is supported below the conveyor rollers on snubbing rollers 40 which may be operably mounted on a spring biased compression frame 42 or the like attached to lower flanges 20. Drive member 38 may be a belt or its equivalent. Snubbing rollers 40 support drive member 38 so that it engages the underside of conveyor rollers 30. As an article 44 is propelled along the conveyor, the weight of the article causes shafts 32 to vibrate up and down (axially) and side to side (longitudinally) relative to aligned holes 24 in rails 14, 16. As a result of this battering, particularly when live roller conveyor 12 is run at high speeds, holes 24 become sufficiently enlarged that the conveyor must be taken apart and rails 14, 16 replaced from time to time. This problem can be essentially obviated by installing spring clip 10 between selected pairs of spaced apart roller shafts 32 as shown in FIG. 1.

Figure 2:
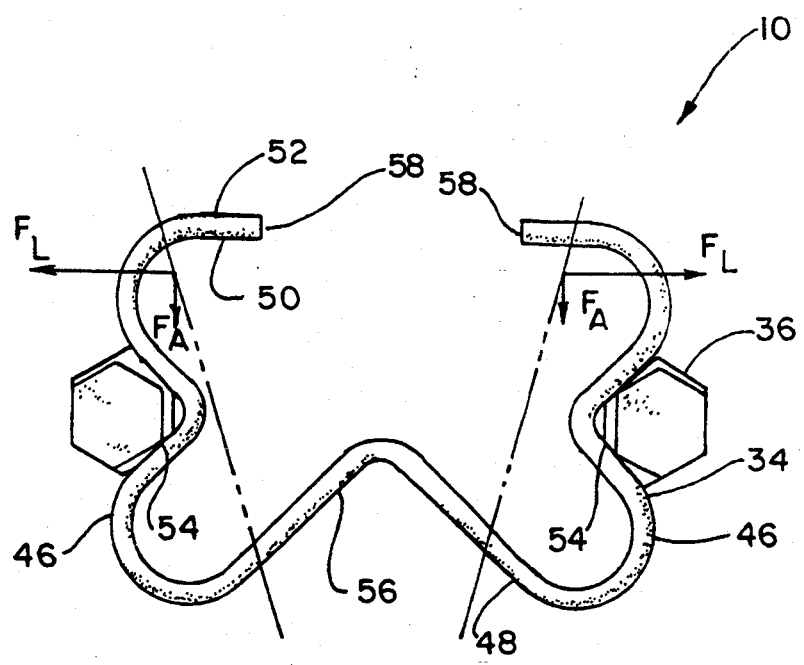
FIG. 2 is a plan view of the spring clip on an enlarged scale between a pair of spaced apart, roller shafts.

Turning to FIG. 2, spring clip 10 is a U-shaped member adapted to lie in a plane orthogonal (i.e., mutually perpendicular) to the longitudinal axis of a selected pair of spaced apart roller shafts 32. Spring clip 10 has a pair of opposing arms 46 connected by a bight 48. Each of arms 46 has an inboard surface 50 and an outboard surface 52 perpendicular to the plane in which the fastener lies and a notch 54 in the outboard surface for receipt of one of said pair of spaced apart roller shafts 32 to which the notch is adapted. Bight 48 preferably includes a counter bent portion 56 which increases the resistance of spring clip 10 to deformation. The free ends of arms 46 are finished with oppositely directed extensions 58 that partially close the open end of the U-shaped member and are of a length that they do not touch or interfere with compression of the spring clip.

Figure 5:
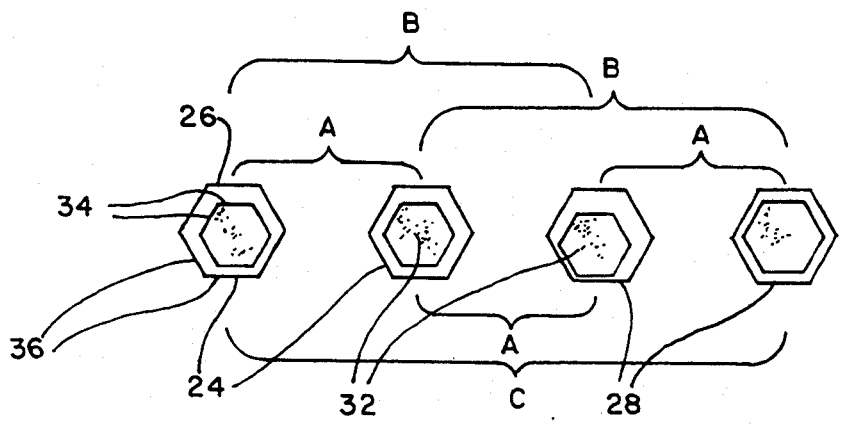
Figure 3:
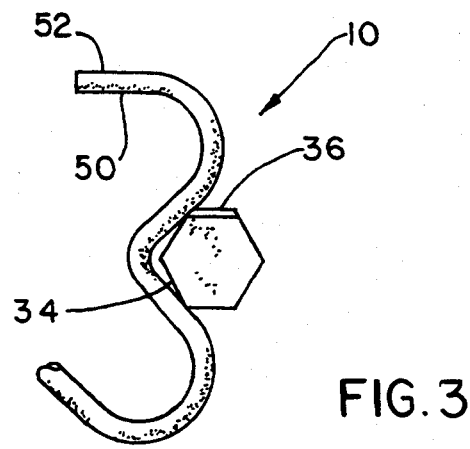
FIG. 3 is a fragmentary plan view showing the spring clip installed between a pair of differently orientated roller shafts.

The distance between notches 54 is greater than the distance between the selected pair of roller shafts 32 when spring clip 10 is in unstressed condition. As shown in FIG. 1, the selected pair of shafts is preferably adjacent but other arrangements affecting the length of spring clip 10 are possible as shown in FIG. 5 (i.e., grouping B, C, etc. in addition to A). In stressed condition, roller shafts 32 are received in notches 54 and the distance between the notches is equal to the distance between the shafts. As shown in FIG. 2, spring clip 10 acts as a spring and exerts a longitudinal ($F_L$) and an axial force ($F_A$) on the roller shafts tending to seat them at the top or bottom of the rails holes 24 so that two adjacent flats of each roller shaft are lodged against two flats of each rail hole. The longitudinal and axial forces dampen side-to-side and up-and-down vibration, respectively, whether roller shafts 32 and aligned holes 24 are arranged as shown in FIGS. 1, 2 and 4 (e.g., the common orientation in conveyors manufactured by Litton) or as shown in FIGS. 3 and 5 (e.g., the common orientation in conveyors manufactured by Alvey).

Figure 4:
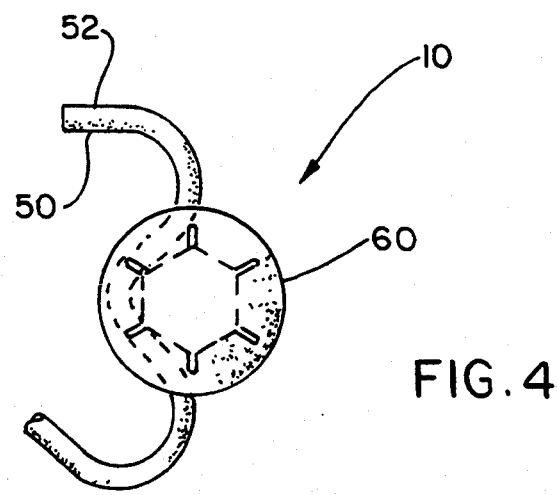
FIG. 4 is a fragmentary plan view showing the spring clip retained by a keeper; and, FIG. 5 is a schematic view showing various pair groups of roller shafts.

A retainer 60, illustrated in FIG. 4, may be installed on the ends of roller shafts 32 to keep spring clip 10 from coming off. The use of such a keeper, while usually optional, may be necessary when aligned holes 24 are already worn and have a burr around the hole that keeps the clip from laying flat against web 22. In addition, normally parallel roller shafts 32 tend to spread apart at one end if the holes are worn, tending to push spring clip 10 off.

Spring clip 10 may be fabricated from any material capable of retaining its formed characteristics under reasonable operating conditions. It should be sufficiently stiff to resist structural deformation from extraneous forces and include memory characteristics sufficient to return it to its initially formed shape when removed from its installed position. Suitable materials for spring clip 10 include steel wire (e.g., 090 spring wire), preferably spring tempered after it has been formed. The spring clip can be easily formed with two dies: A length of wire is cut, the bend in the middle (counter bent portion 56) is made with one die and then a second die is used to make bends (forming arms 46) at each end. The same dies can be used to make clips with longer or shorter bights 48 for different spacings between the conveyor shafts, the only difference being the length of the wire used.

In use, a suitable spring clip 10 is selected having an appropriate spacing between notches 54 for the selected pair of spaced apart conveyor shafts 32. A compressive force is applied to arms 46 so that the space between notches 54 is made just equal to or less than the distance between the pair of spaced apart roller shafts. While the compressive force is maintained, the U-shaped fastener is held generally orthogonal to the longitudinal axis of the roller shafts and slipped between the ends of the shafts into abutment with web 22 such that each notch 54 is aligned for receipt of one of the roller shafts. When the compressive force is released, the clip is still under stress and exerts a longitudinal and axial force on the roller shafts tending to seat them against two flats of each rail hole, damping up-and-down and side-to-side vibration and reducing wear on the holes. Other pairs of conveyor shafts in live roller conveyor 12 are similarly outfitted with spring clips 10, preferably with no roller shaft being a member of more than one pair as the clips would otherwise work against one another. For roller conveyors with odd numbers of roller shafts, a screw head or the like can be provided on web 22 to pair with the odd shaft.

In view of the above, it will be seen that the several objects of the invention are achieved and other advantageous results attained. As various changes could be made in the above constructions and methods without departing from the scope of the invention, it is intended that all matter contained in the above description or shown in the accompanying drawings shall be interpreted as illustrative and not in a limiting sense.

What is claimed:

1. A spring clip for damping up-and-down and side-to-side vibration in a live roller conveyor between a pair of spaced apart roller shafts, each of which roller shafts has a longitudinal axis, relative to a pair of spaced apart, parallel rails with aligned holes having a top and bottom through which opposite ends of the roller shafts pass, said roller shafts and said holes having flats and similar but not identical regular polygonal cross-sections, said clip comprising:

a U-shaped fastener adapted to lie in a plane orthogonal to the longitudinal axis of said pair of spaced apart roller shafts, said fastener having a pair of opposing arms, each of which has an inboard and outboard surface perpendicular to the plane in which the fastener lies and a notch in the outboard surface for receipt of one of said pair of spaced apart roller shafts, said notches being spaced apart a distance greater than the distance between the pair of spaced apart roller shafts when the arms are in unstressed condition and said notches being spaced apart a distance equal to the distance between the pair of spaced apart roller shafts in stressed condition, whereby said U-shaped fastener acts as a spring and exerts a force on the roller shafts tending to seat them at the top or bottom of the rail holes so that two adjacent flats of each roller shaft are lodged against two flats of each rail hole when said roller shafts are received in said notches.

2. The spring clip of claim 1 wherein the holes and the roller shafts have a hexagonal cross-section and the pair of spaced apart roller shafts are adjacent and lie in a common plane.

3. The spring clip of claim 2 wherein the pair of opposing arms are connected by a bight with a counter bent portion which increases the resistance of the spring clip to deformation.

4. A live roller conveyor comprising:
- a plurality of spaced apart roller shafts lying in a plane, each of which roller shafts has a longitudinal axis;
- a pair of spaced apart, parallel rails with aligned holes having a top and a bottom through which opposite ends of the roller shafts pass, said roller shafts and said holes having flats and similar but not identical regular polygonal cross-sections;
- a spring clip for damping up-and-down and side-to-side vibration between a pair of the roller shafts relative to the rail holes, said spring clip comprising a U-shaped fastener adapted to lie in a plane orthogonal to the longitudinal axis of said pair of spaced apart roller shafts, said fastener having a pair of opposing arms, each of which has an inboard and outboard surface perpendicular to the plane in which the fastener lies and a notch in the outboard surface for receipt of at least one flat of one of said pair of spaced apart roller shafts, said notches being spaced apart a distance slightly greater than the distance between the pair of spaced apart roller shafts when the arms are in unstressed condition and said notches being spaced apart a distance equal to the distance between the pair of spaced apart roller shafts in stressed condition, whereby said U-shaped fastener acts as a spring and exerts a force on the roller shafts tending to seat them at the top or bottom of the rail holes so that two adjacent flats of each roller shaft are lodged against two flats of each rail hole when said roller shafts are received in said notches.

5. The roller conveyor of claim 4 wherein the holes and roller shafts have a hexagonal cross-section and the pair of spaced apart roller shafts are adjacent and lie in a common plane.

6. The roller conveyor of claim 5 wherein the pair of opposing arms are connected by a bight with a counter bent portion which increases the resistance of the spring clip to deformation.

7. The roller conveyor of claim 6 wherein the spring clip is formed from a length of spring steel and is spring tempered after it is formed.

8. A method for damping up-and-down and side-to-side vibration in a live roller conveyor between a pair of spaced apart roller shafts lying in a plane, each of which roller shafts has a longitudinal axis, relative to a pair of spaced apart, parallel rails with aligned holes through which opposite ends of the roller shafts pass, said roller shafts and said holes having flats and similar but not identical regular polygonal cross-sections comprising:
- selecting a U-shaped fastener adapted to lie in a plane orthogonal to the longitudinal axis of said pair of spaced apart roller shafts, said fastener having a pair of opposing arms connected by a bight, each of said arms having an inboard and outboard surface perpendicular to the plane in which the fastener lies and a notch for receipt of one of said pair of spaced apart roller shafts, said notches being spaced apart a distance greater than the distance between the pair of spaced apart roller shafts when the arms are in unstressed condition and said notches being spaced apart a distance equal to the distance between the pair of spaced apart roller shafts in stressed condition;
- applying a compressive force on the arms so that the space between the notches is just equal to or less than the distance between the pair of spaced apart roller shafts;
- slipping the U-shaped fastener between the ends of the pair of spaced apart roller shafts such that each notch is aligned for receipt of one of the roller shafts when the compressive force on the arms is released; and,
- releasing the force on the arms whereby the U-shaped fastener acts as a spring and exerts a force on the roller shafts tending to seat them in the rail holes so that two adjacent flats of each roller shaft are lodged against two flats of each rail hole when said roller shafts are received in said notches.

* * * * *